United States Patent [19]

Hergenrother et al.

[11] Patent Number: 4,889,912

[45] Date of Patent: Dec. 26, 1989

[54] ACETYLENE TERMINATED ASPARTIMIDES AND RESINS THEREFROM

[75] Inventors: Paul M. Hergenrother, Yorktown; John W. Connell, Newport News; Stephen J. Havens, Newport News, all of Va.

[73] Assignee: The United States of America as represented by the Administrator of the National Aeronautics and Space Administration, Washington, D.C.

[21] Appl. No.: 328,392

[22] Filed: Mar. 24, 1989

Related U.S. Application Data

[63] Continuation-in-part of Ser. No. 87,375, Aug. 20, 1987, abandoned.

[51] Int. Cl.$^4$ ............................................. C08G 73/12
[52] U.S. Cl. .................................... 528/125; 548/520; 528/126; 528/128; 528/171–175; 528/212; 528/215; 528/218; 528/219; 528/220; 528/224; 528/228; 528/229; 528/373; 528/374; 528/216; 528/314; 528/315; 528/310; 528/321; 528/322; 528/170; 526/252; 526/262

[58] Field of Search ................ 548/520; 528/125, 126, 528/128, 171–175, 212, 215, 218, 219, 220, 224, 228, 229, 373, 374, 216, 314, 315, 310, 321, 322, 170

[56] References Cited

U.S. PATENT DOCUMENTS 3,533,996 10/1970 Grundschober et al. ........... 526/210

*Primary Examiner*—John Kight
*Assistant Examiner*—Frederick Krass
*Attorney, Agent, or Firm*—George F. Helfrich; John R. Manning; Charles E. B. Glenn

[57] ABSTRACT

Acetylene terminated aspartimides are prepared using two methods. In the first, an amino-substituted aromatic acetylene is reacted with an aromatic bismaleimide in a solvent of glacial acetic acid and/or m-cresol. In the second method, an aromatic diamine is reacted with an ethynyl containing maleimide, such as N-(3-ethynylphenyl) maleimide, in a solvent of glacial acetic acid and/or m-cresol. In addition, acetylene terminated aspartimides are blended with various acetylene terminated oligomers and polymers to yield composite materials exhibiting improved mechanical properties.

22 Claims, No Drawings

ACETYLENE TERMINATED ASPARTIMIDES AND RESINS THEREFROM

ORIGIN OF THE INVENTION

The invention described herein was jointly made by employees of the United States Government and contract employees in the performance of work under a NASA Contract and Grant and is subject to the provisions of Public Law 96-517 (35 USC 202) in which the contractor has elected not to retain title and/or the provisions of Section 305 of the National Aeronautics and Space Act of 1958, as amended, Public Law 85-568 (72 Stat. 435; 42 USC 2457).

CROSS-REFERENCE TO RELATED APPLICATION

This application is a continuation-in part of U.S. patent application Ser. No. 087,375, filed Aug. 20, 1987, now abandoned.

BACKGROUND OF THE INVENTION

Structural resins with a favorable combination of properties such as long term environmental durability over a temperature range of −54° to 220° C., damage tolerance, and solvent resistance are required for use in hot areas on military and commercial aircraft. Commercially available bismaleimide resins such as Compimide 353 (available from Boots/Technochemie) and XU-292 (available from Ciba/Geigy Corporation) previously have been formulated with other components to enhance properties such as melt processability and toughness. These formulated systems have found use in a variety of applications such as composite matrices and adhesives for use at temperatures in excess of those at which epoxy systems can perform.

Polyaspartimides are commonly synthesized by reaction of aromatic bismaleimides with aromatic diamines. These polymers have a repeat unit of the following general formula:

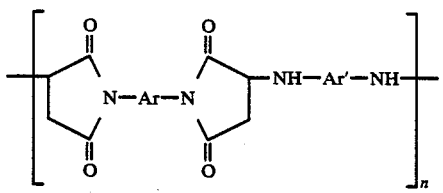

where Ar and Ar' are divalent aromatic radicals, such as 1,3-phenylene or 4,4'-oxydiphenylene.

High molecular weight polyaspartimides are known [J. V. Crivello, *J. Polymer Sci.*, 11, 1185(1973)] and can form tough, flexible films with good tensile properties and can be compression molded. However, uncrosslinked polyaspartimides are susceptible to solvent attack, especially in a stressed condition, and upon exposure undergo solvent induced stress crazing and cracking. In addition, polyaspartimides are generally soluble in dipolar solvents such as N,N-dimethylformamide, dimethyl sulfoxide, N,N-dimethylacetamide, N-methylpyrrolidinone, phenol, and m-cresol. Melt condensation of aromatic diamines and bismaleimides has been reported to yield cross-linked polymers (polyaspartimides) [F. Grundschober and J. Sambeth (To Soc. Rhodiacita), U.S. Pat. No. 3,533,996 (Oct. 13, 1970)].

In most cases, less than a stoichiometric amount of an aromatic diamine is reacted with a bismaleimide to yield a low or intermediate molecular weight polyaspartimide terminated with maleimide groups. Upon heating, the terminal maleimide groups react to yield a cross-linked resin having less toughness than the linear polyaspartimides but with improved solvent resistance and higher use temperature. The degree of crosslinking can be controlled to a large extent by the stoichiometry. A common material of this type is Kerimid 601 (available from Rhone Poulenc), used extensively in printed circuit boards.

The acetylene terminated aspartimides (ATA) of this invention present new compositions of matter. The properties of cured acetylene terminated aspartimides are similar to those of the cured unformulated bismaleimides but they have significantly higher toughness. In addition, the acetylene terminated aspartimides are formed as stereoisomers (d, l and meso isomers), and as such have lower melt temperatures than bismaleimides with similar chemical structure. Since they are a mixture of isomers, they also melt over a broad temperature range. Both of these factors make acetylene terminated aspartimides more amenable to process into adhesive tape and prepreg via melt technique than comparable bismaleimides.

The acetylene terminated aspartimides can be readily blended with acetylene terminated arylene ether oligomers and polymers to yield cured resins with high toughness. The crosslink density can be controlled by varying the ratio of acetylene terminated aspartimide to acetylene terminated arylene ether oligomers or polymers and also by varying the length and chemical structure of the linear segment in the acetylene terminated arylene ether oligomers or polymers. The acetylene terminated aspartimides can also be blended with acetylene terminated polysulfones to yield resins with high fracture toughness.

Accordingly, it is an object of this invention to provide a method of preparing acetylene terminated aspartimides.

A further object of this invention is to provide acetylene terminated aspartimides that are useful as adhesives, coatings, films and composite matrices.

A further object of the present invention is to provide blends of acetylene terminated aspartimides and other acetylene terminated oligomers and polymers that are useful as adhesives, coatings, films, membranes and composite matrices.

SUMMARY OF THE INVENTION

According to the present invention, the foregoing and additional objects were attained by synthesizing aspartimide oligomers and polymers containing terminal acetylene groups. Acetylene terminated aspartimides were prepared using two methods. In the first, an amino-substituted aromatic acetylene was reacted with an aromatic bismaleimide in a solvent of glacial acetic acid and/or m-cresol. In the second method, an aromatic diamine as reacted with an ethynyl containing maleimide, such as N-(3-ethynylphenyl) maleimide, in a solvent of glacial acetic acid and/or m-cresol. In addition, acetylene terminated aspartimides were blended with various acetylene terminated oligomers and polymers to yield composite materials exhibiting improved mechanical properties.

DETAILED DESCRIPTION OF THE INVENTION

The present invention comprehends synthesizing acetylene terminated aspartimides using two methods. In the first, an amino-substituted aromatic acetylene is reacted with an aromatic bismaleimide. The general reaction sequence is represented by the following equation:

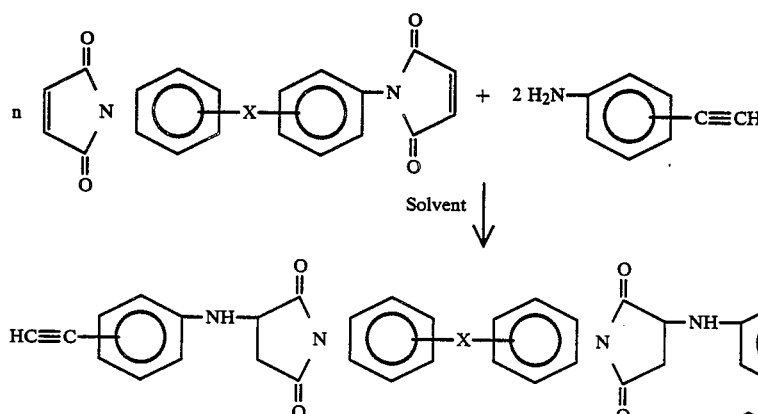

where x is selected from a group of radicals consisting of nil, $CH_2$, O, S, C=O, $SO_2$, $C(CH_3)_2$, $C(CF_3)_2$,

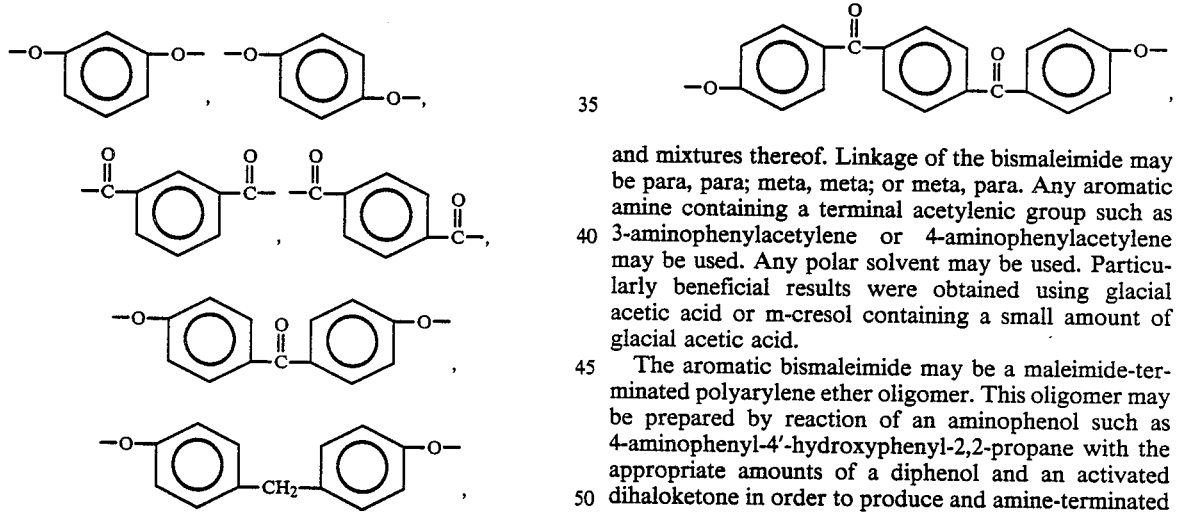

and mixtures thereof. Linkage of the bismaleimide may be para, para; meta, meta; or meta, para. Any aromatic amine containing a terminal acetylenic group such as 3-aminophenylacetylene or 4-aminophenylacetylene may be used. Any polar solvent may be used. Particularly beneficial results were obtained using glacial acetic acid or m-cresol containing a small amount of glacial acetic acid.

The aromatic bismaleimide may be a maleimide-terminated polyarylene ether oligomer. This oligomer may be prepared by reaction of an aminophenol such as 4-aminophenyl-4'-hydroxyphenyl-2,2-propane with the appropriate amounts of a diphenol and an activated dihaloketone in order to produce and amine-terminated polyarylene ether oligomer. This diamino oligomer may than be converted to the bismaleimide by reaction with maleic anhydride followed by cyclodehydration.

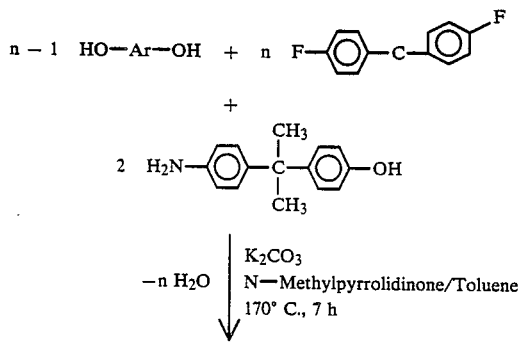

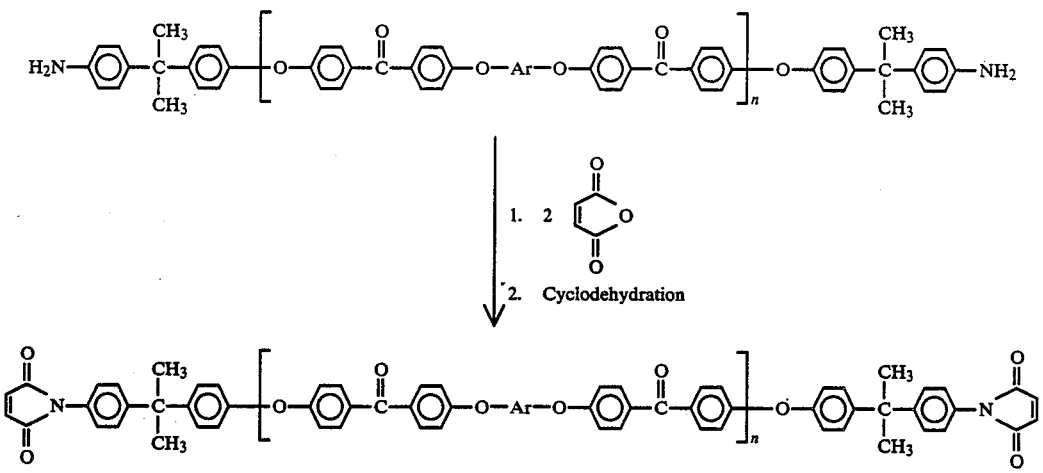

Alternately, the maleimide-terminated polyarylene ether oligomers can be made in one step by the reaction of compounds such as

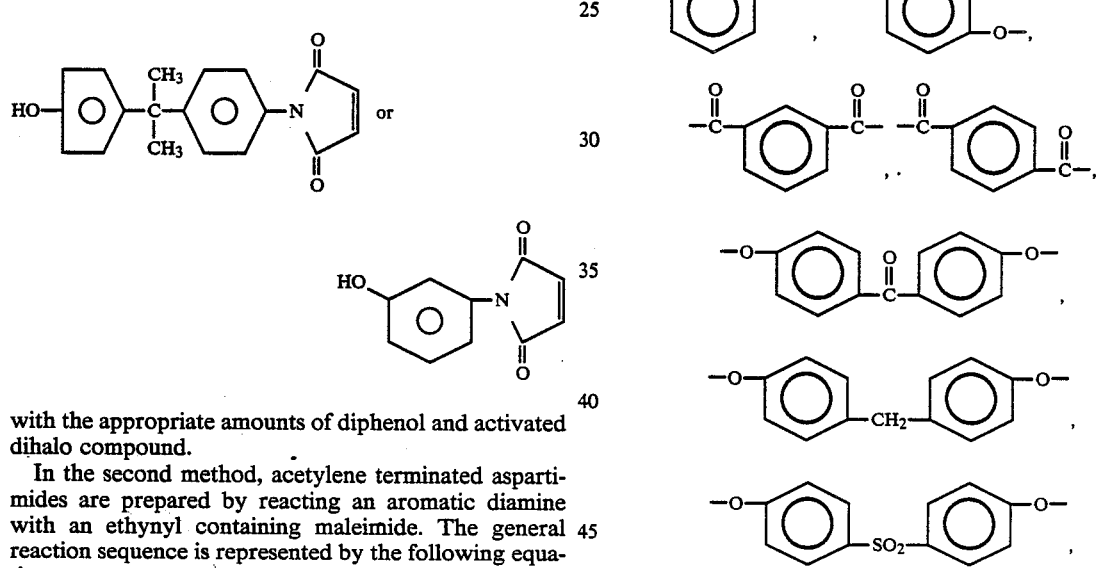

with the appropriate amounts of diphenol and activated dihalo compound.

In the second method, acetylene terminated aspartimides are prepared by reacting an aromatic diamine with an ethynyl containing maleimide. The general reaction sequence is represented by the following equation:

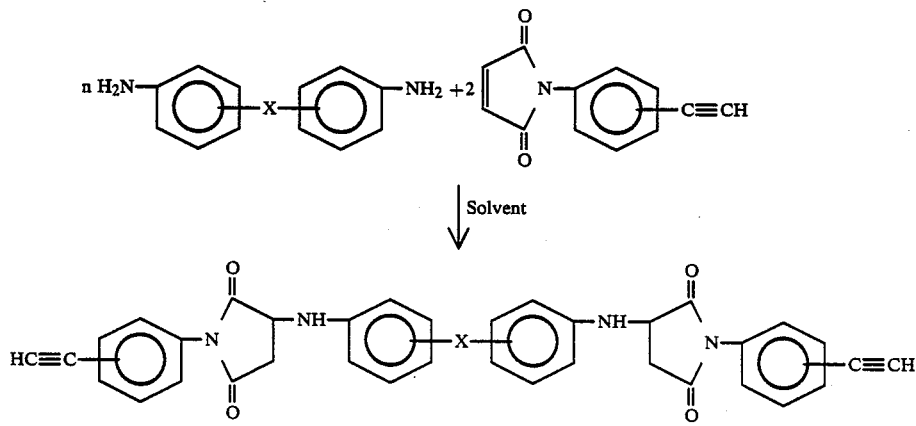

where x is selected from a group of radicals consisting of nil, $CH_2$, O, S, C=O, $SO_2$, $C(CH_3)_2$, $C(CF_3)_2$,

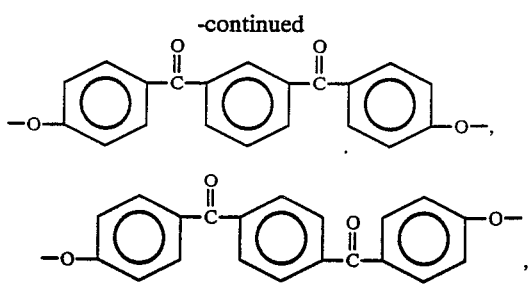

and mixtures thereof. Linkage of the diamine may be para, para; meta, meta; or meta, para. Any ethynyl containing maleimide such as N-(3-ethynylphenyl) maleimide or N-(4-ethynylphenyl) maleimide may be used. As in method 1 any of various polar solvents may be used.

The aromatic diamine may be an amine-terminated polyarylene ether oligomer as previously described for the first method.

The present invention further comprehends novel composite materials formed by blending acetylene terminated aspartimides with various acetylene termined polymers. The acetylene terminated aspartimide from the reaction of 3-aminophenylacetylene and N,N'-bismaleimido-4,4'-diphenylmethane was blended with an equal weight of an acetylene terminated sulfone oligomer (the number of average molecular weight of the sulfone segment was approximately 9000 g/mole). Such oligomers have the following general formula:

where n is an integer from 3 to 59. The resulting blend was then processed and cured at a maximum temperature range of 230°–250° C. A molded specimen prepared therefrom showed a significant improvement in fracture toughness with a $K_{Ic}$ (stress intensity factor) of approximately 1400 psi.in$^{\frac{1}{2}}$ compared to unblended acetylene terminated aspartimides. This specimen was not affected upon exposure to methylene chloride or other solvents. A 30% solids solution of the blend in methylene chloride was used to impregnate carbon/graphite fabric. The prepreg was stacked and cured in an autoclave by holding at 149° C. for 20 minutes and at 177° C. for two hours under 80 psi. The composite was postcured in a press at 232° C. for one hour under 100 psi to give a final composite with a calculated resin content of approximately 41%. At 25° C., flexural strength, flexural modulus, and short beam shear strengths were determined to be 93,500 psi, 7,575,000 psi, and 8600 psi, respectively. At 177° C., the respective values were 87,800 psi, 6,266.000 psi, and 7200 psi.

The invention is not limited to this example of blends of the acetylene terminated aspartimides with sulfone oligomers but includes blends in varying proportions of the acetylene terminated aspartimides with all acetylene terminated polyarylene ethers of the following general structure which can be prepared according to a procedure similar to that disclosed in U.S. Pat. No. 4,431,761:

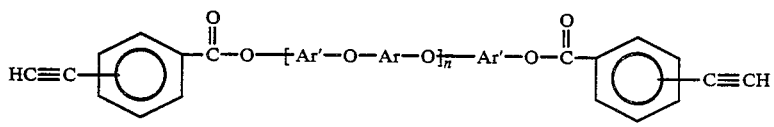

wherein n is an integer representing 3 to 60 repeat units. Linkage of the phenylethynyl groups may be either meta or para. Ar is a divalent aromatic radical selected

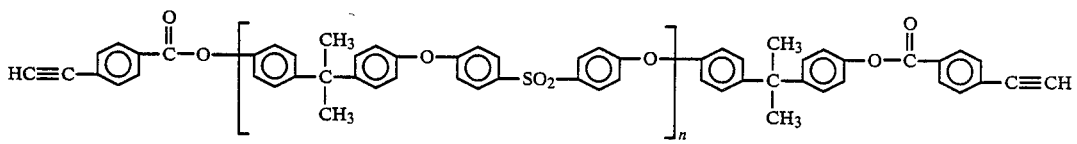

from the group consisting of:

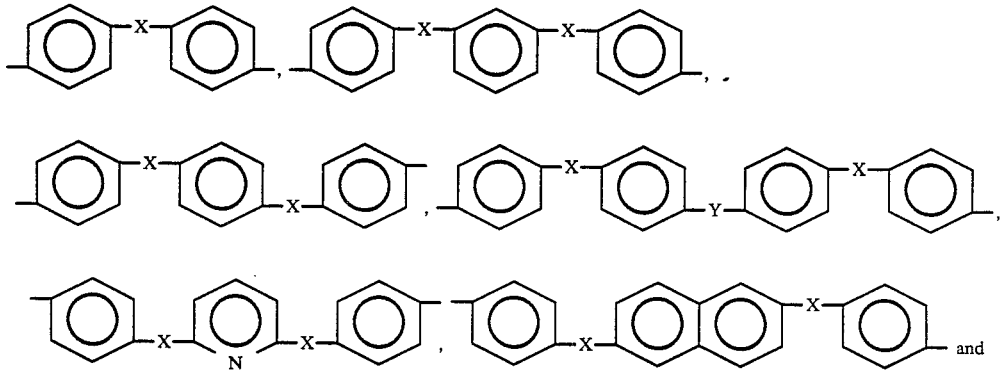

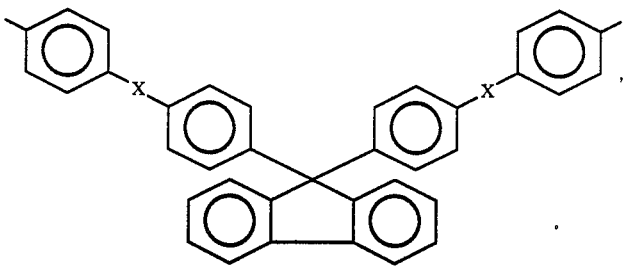

wherein X is selected from the group consisting of O=C and SO$_2$, and y is a bond, or is selected from the group consisting of O, S, CH$_2$, C=O, SO$_2$, C(CH$_3$)$_2$, and C(CF$_3$)$_2$. Ar' is a divalent aromatic radical selected from the group consisting of:

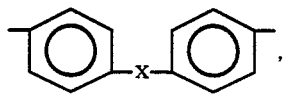

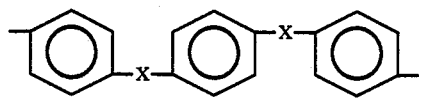

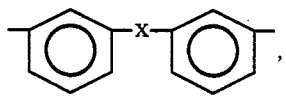

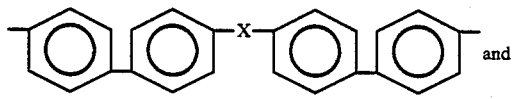 and

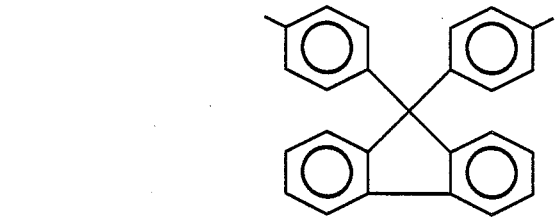

wherein X is a bond or is selected from the group: CH$_2$, O, S, C=O, SO$_2$, C(CH$_3$)$_2$, and C(CF$_3$)$_2$.

It should become obvious to those skilled in the art that this invention is not limited to the examples herein described. Additionally, this invention includes blends of acetylene terminated aspartimides with acetylene terminated phenylquinoxaline oligomers, acetylene terminated imide oligomers, acetylene terminated ester oligomers and various other acetylene terminated oligomers.

EXAMPLES

Example I

Synthesis of an ATA by reaction of 3-aminophenylacetylene with N,N'-bismaleimido-4,4'-diphenylmethane A solution of N,N'-bismaleimido-4,4'-diphenylmethane (38.34 g, 0.10 mole) and distilled 3-aminophenylacetylene (23.43 g, 0.20 mole) was dissolved in 100 mL of m-cresol containing 4 ml glacial acetic acid. The resulting solution was stirred under a nitrogen atmosphere with the temperature of the reaction mixture maintained at 100°–110° C. for 48 hours. The solvent was removed under vacuum and the residue dried under vacuum at 90° C. A nearly quantitative yield of light yellow solid was obtained which was a mixture of d, l and meso isomers, mp 104°–110° C. The material resisted recrystallization but an analytically pure sample was obtained by precipitation from a chloroform solution with methanol. Elemental analysis calculated for C$_{37}$H$_{28}$N$_4$O$_4$: C, 74.98%; H, 4.76%; N, 9.45%. Found: C, 75.04%; H, 4.93%; N, 9.29%. From differential scanning calorimetry analysis (DSC) of this ATA, a melting endotherm was detected at 81° C. and an exothermic peak due to reaction of the acetylene groups was detected at 266° C. From thermogravimetric analysis (TGA) at a heating reate of 2.5° C. per minute, this ATA after curing at 250° C. for one hour, exhibited 5% weight loss in air at 370° C. and in nitrogen at 355° C. By isothermogravimetric analysis at 260° C. in circulating air, this cured ATA exhibited 17% weight loss after 110 hours.

Example II

Synthesis of an ATA by Reaction of N-(3-ethynylphenyl)maleimide with 4,4'-diaminodiphenylmethane N-(3-ethynylphenyl)maleimide.

Maleic anhydride (79.6 g, 0.81 mole) was added to a solution of distilled 3-aminophenylacetylene (95.1 g, 0.81 mole) dissolved in 500 mL of dry N,N'-dimethylacetamide (DMAc) at 5°–10° C. After addition, another 300 mL of DMAc was added and the mixture stirred at room temperature for two hours. Nickel acetate tetrahydrate (0.8 g) and acetic anhydride (300 mL) were added to the reaction mixture and stirring was continued for 12 hours at room temperature to affect cyclodehydration. The crude product was isolated by precipitation in water and recrystallized from methanol to provide N-(3-ethynylphenyl)maleimide (128 g, 80% yield) as a yellow crystalline solid, mp 129°–131° C. Elemental analysis calculated for C$_{12}$H$_7$NO$_2$: C, 73.09%; H, 3.58%; N, 7.10%. Found: C, 72.94%; H, 3.61%; N, 7.04%.

Acetylene Terminated Aspartimide (ATA)

N-(3-ethynylphenyl)maleimide (13.80 g, 0.070 mol) and 4,4'-diaminodiphenylmethane (6.94 g, 0.035 mole) were dissolved in 200 mL of glacial acetic acid and the solution heated to reflux for 24 hours under a nitrogen atmosphere. The solution was added to water to precipitate the ATA as a light yellow solid in nearly quantitative yield as a mixture of d, l and meso isomers, mp 110°–115° C. Elemental analysis calculated for $C_{37}H_{28}N_4O_4$: C, 74.98%; H, 4.76%; N, 9.45%. Found: C, 74.81%; H, 4.80%; N, 9.38%. From differential scanning calorimetric analysis of this ATA, a melting endotherm was detected at 119° C. and an exothermic peak due to reaction of acetylene groups detected at 209° C. From thermogravimetric analysis, this ATA after curing at 300° C. for 15 minutes exhibited 5% weight loss in air at 385° C.

Example III

Preparation of a 1:1 blend of the ATA prepared from the reaction of 3-aminophenylacetylene with N,N'-bismaleimido-4,4'-diphenylmethane and an acetylene terminated sulfone oligomer (number average molecular weight of sulfone segment, 8890 g/mole).

The ATA from the reaction of 3-aminophenylacetylene with N,N'-bismaleimido-4,4'-diphenylmethane (50 g) and an acetylene terminated sulfone oligomer (number average molecular weight of sulfone segment, 8890 g/mole) (50 g) were dissolved in 200 mL of chloroform with warming. The solution was mixed and the chloroform allowed to evaporate. The residue was crushed, allowed to air dry, and then fried under vacuum at 90° C. Solutions of this blend in 1,4-dioxane were used to coat adhesive specimens and methylene chloride solutions were used to prepare carbon-graphite prepreg. The blend can also be prepared directly in 1,4-dioxane. For the preparation of moldings, the blend was prereacted at 200° C. for ten minutes in order to decrease melt flow. From TGA this blend after curing at 250° C. for one hour exhibited 5% weight loss in air at 386° C. and in nitrogen at 392° C. By isothermogravimetric analysis at 260° C. in circulating air, this cured blend exhibited 10% weight loss after 110 hours.

The invention is not limited to these examples.

What is claimed is:

1. The class of acetylene terminated aspartimides having the general formula:

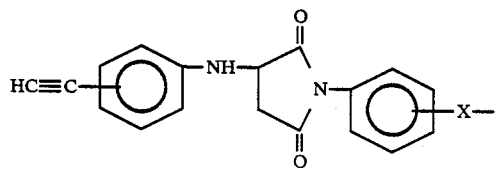

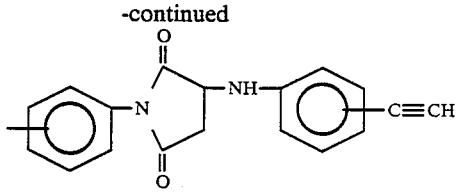

where X is a bond or a divalent radical selected from the group consisting of $CH_2$, O, S, C=O, $SO_2$, $C(CH_3)_2$, $C(CF_3)_2$,

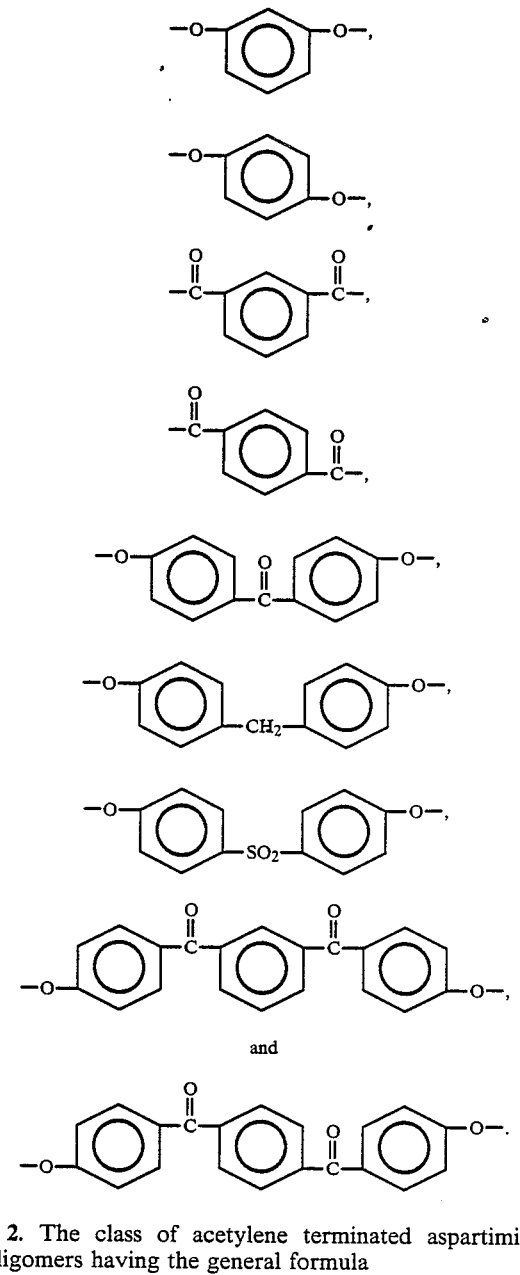

and

2. The class of acetylene terminated aspartimide oligomers having the general formula

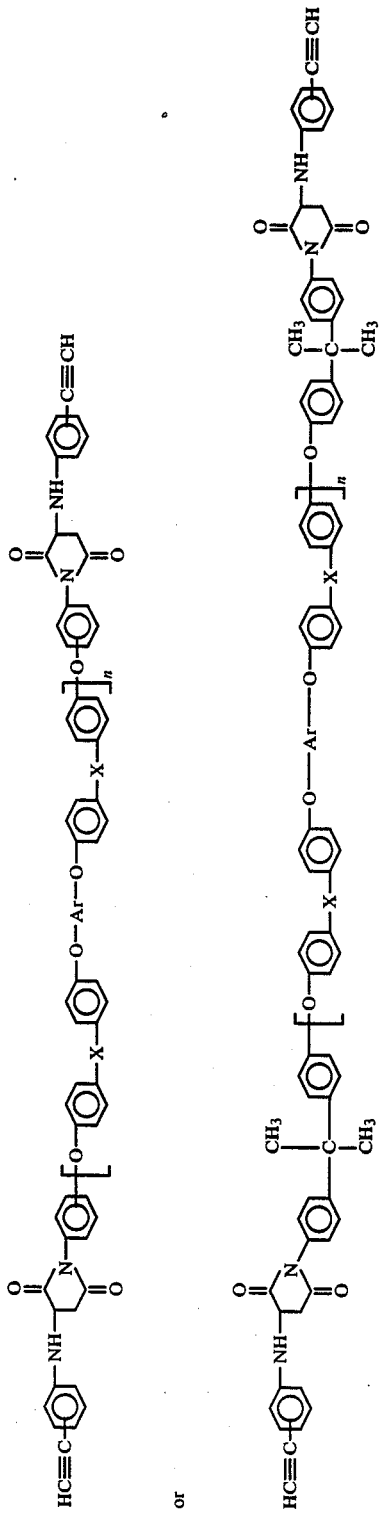

where n is an integer from one to sixty; X is a divalent radical selected from the group consisting of:

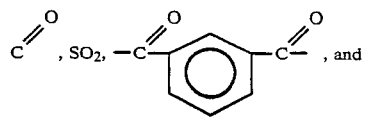, and

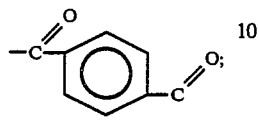;

and Ar is a divalent radical selected from the group consisting of:

,

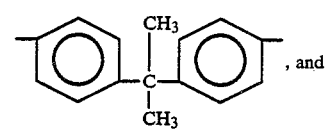, and

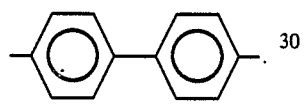.

3. The class of acetylene terminated aspartimides having the general formula:

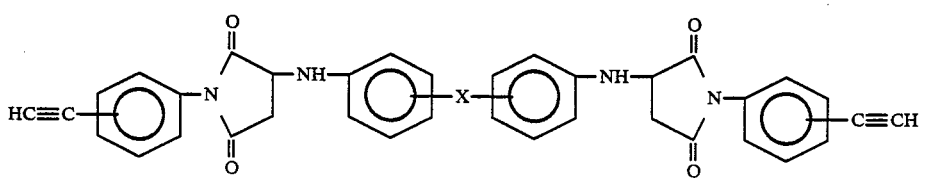

where X is a bond or a divalent radical selected from the group consisting of $CH_2$, O, S, C=O, $SO_2$, $C(CH_3)_2$, $C(CF_3)_2$,

-O-⬡-O-⬡-O-,

-C(=O)-⬡-C(=O)--C(=O)-⬡-C(=O)-,

-O-⬡-C(=O)-⬡-O-,

-O-⬡-$CH_2$-⬡-O-,

-O-⬡-$SO_2$-⬡-O-,

-O-⬡-C(=O)-⬡-C(=O)-⬡-O-, and

-O-⬡-C(=O)-⬡-C(=O)-⬡-O-.

4. The class of acetylene terminated aspartimide oligomers having the general formula:

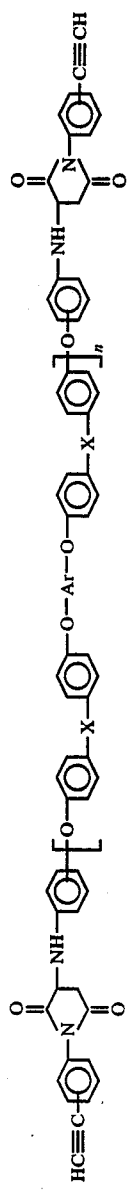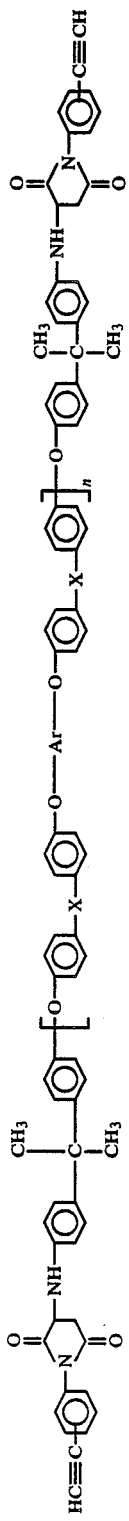

where n is an integer from one to sixty; X is a divalent radical selected from the group consisting of

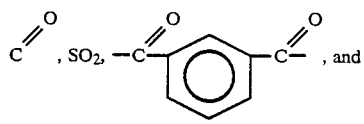

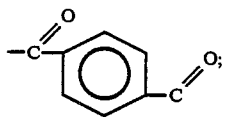

and Ar is a divalent radical selected from the group consisting of:

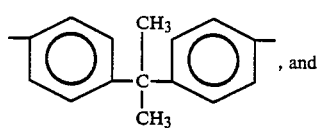

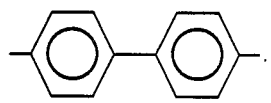

5. An acetylene terminated aspartimide according to claim 1 and any other acetylene terminated oligomer in intimate contact therewith.

6. An acetylene terminated aspartimide oligomer according to claim 2 and any other acetylene terminated oligomer in intimate contact therewith.

7. A composition according to claim 5 wherein said acetylene terminated oligomer is an acetylene terminated polysulfone having the formula:

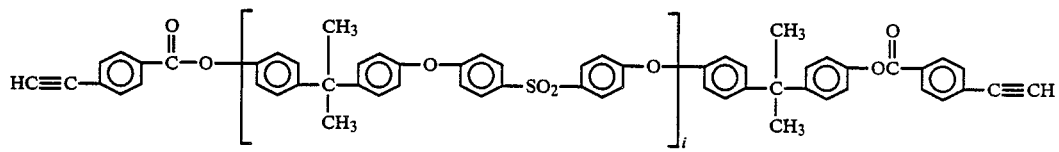

where i is an integer from three to fifty-nine.

8. A composition according to claim 5 wherein said acetylene terminated oligomer is an acetylene terminated polyarylene ether having the following formula:

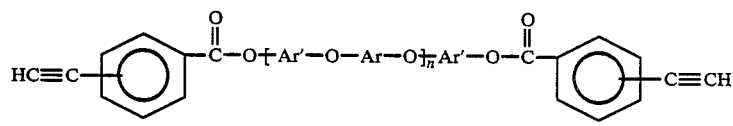

wherein n is an integer representing 3 to 60 repeat units, linkage of the phenylether groups being either meta or para; Ar is a divalent aromatic radical selected from the group consisting of:

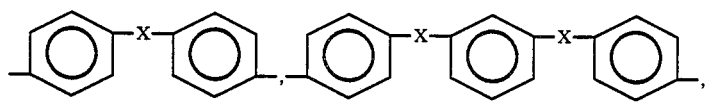

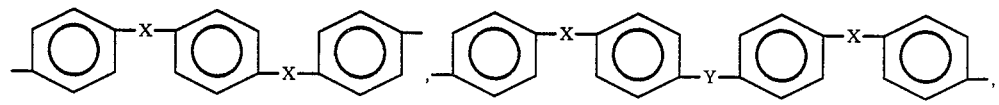

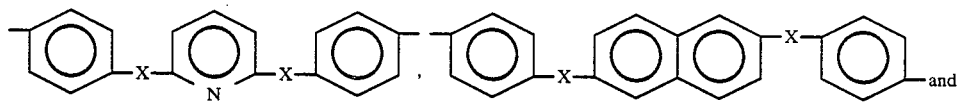

-continued

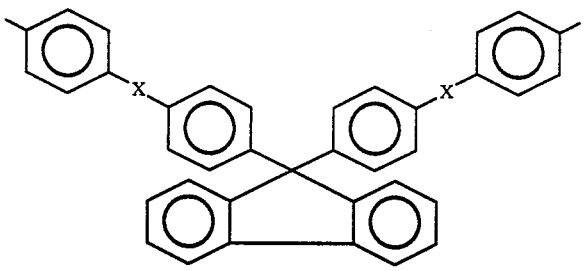

where X is selected from the group consisting of O=C and SO₂, and Y is a bond, or is a member selected from the group consisting of O, S, CH₂, C=O, SO₂, C(CH₃)₂, and C(CF₃)₂; and Ar' is a divalent aromatic radical selected from the group consisting of:

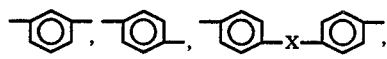

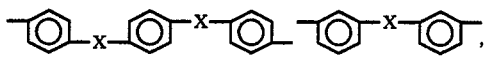

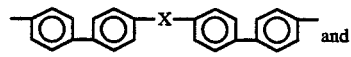 and

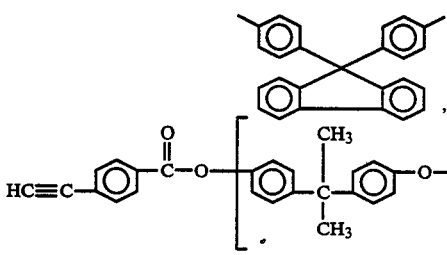

wherein X is a bond or is a member selected from the group consisting of: CH₂, O, S, O=C, SO₂, C(CH₃)₂, and C(CF₃)₂.

9. A composition according to claim 5 wherein said acetylene terminated oligomer is an acetylene terminated phenylquinoxaline oligomer.

10. A composition according to claim 5 wherein said acetylene terminated oligomer is an acetylene terminated imide oligomer.

11. A composition according to claim 5 wherein said acetylene terminated oligomer is an acetylene terminated ester oligomer.

12. An acetylene terminated aspartimide according to claim 3 and any other acetylene terminated oligomer in intimate composition therewith.

13. An acetylene terminated aspartimide oligomer according to claim 4 and any other acetylene terminated oligomer in intimate composition therewith.

14. A composition according to claim 12 wherein said acetylene terminated oligomer is an acetylene terminated polysulfone having the formula:

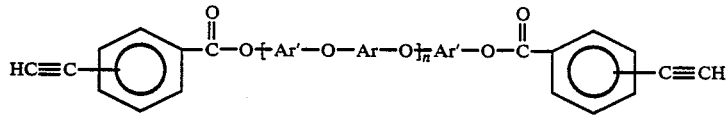

where i is an integer from three to fifty-nine.

15. A composition according to claim 12 wherein said acetylene terminated oligomer is an acetylene terminated polyarylene ether having the following formula:

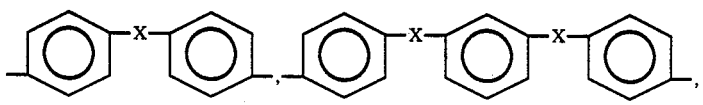

wherein n is an integer representing 3 to 60 repeat units, linkage of the phenylether groups being either meta or para; Ar is a divalent aromatic radical selected from the group consisting of:

-continued

wherein X is selected from the group consisting of O=C and SO₂, and Y is a bond, or is a member selected from the group consisting of O, S, CH₂, C=O, SO₂, C(CH₃)₂, and C(CF₃)₂; and Ar' is a divalent aromatic radical selected from the group consisting of:

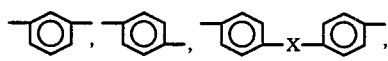

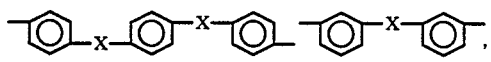

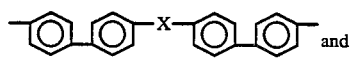

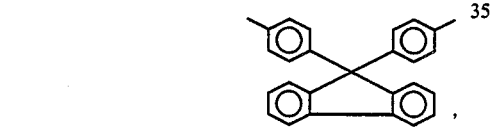

wherein X is a bond or is selected from the group: CH₂, O, S, C=O, SO₂, C(CH₃)₂, and C(CF₃)₂.

16. A composition according to claim 12 wherein said acetylene terminated oligomer is an acetylene terminated phenylquinoxaline oligomer.

17. A composition according to claim 12 wherein said acetylene terminated oligomer is an acetylene terminated imide oligomer.

18. A composition according to claim 12 wherein said acetylene terminated oligomer is an acetylene terminated ester oligomer.

19. A process for preparing an acetylene-terminated aspartimide having the formula:

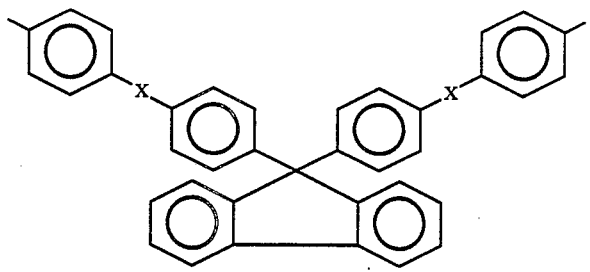

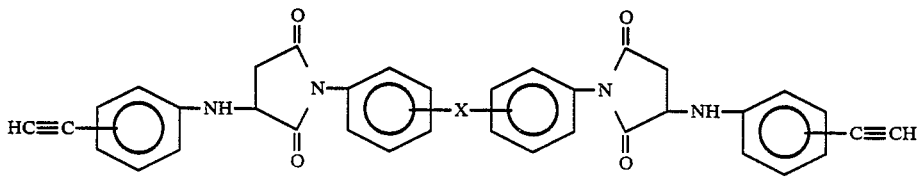

where X is a bond or a divalent radical selected from the group consisting of CH₂, O, S, O=C, SO₂, C(CH₃)₂, C(CF₃)₂, comprising the steps of:
reacting an amino-substituted aromatic acetylene with an aromatic bismaleimide having the formula:

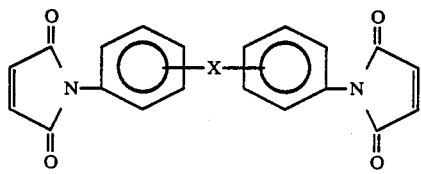

in a polar solvent;
evaporating said polar solvent; and
removing all traces of the polar solvent to produce said acetylene-terminated aspartimide.

20. A process for preparing acetylene terminated aspartimide oligomers having the formula

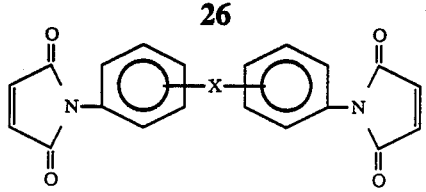

in a polar solvent;
evaporating said polar solvent; and
removing all traces of the polar solvent to produce said acetylene-terminated aspartimide.

20. A process for preparing acetylene terminated aspartimide oligomers having the formula

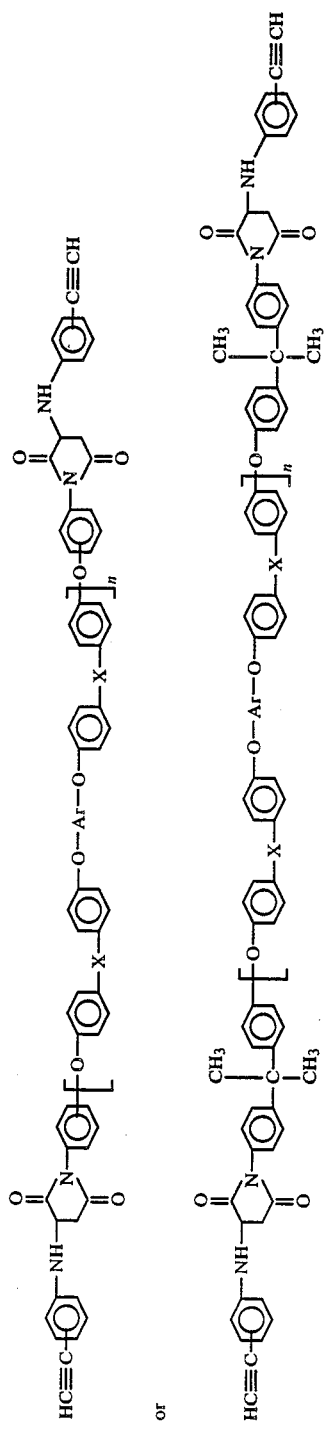

wherein n is a integer from one to sixty; X is a divalent radical selected from the group consisting of:

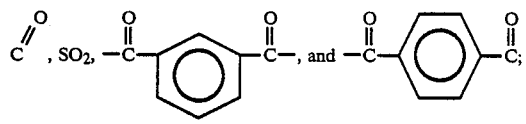

and Ar is a divalent radical selected from the group consisting of:

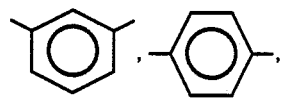

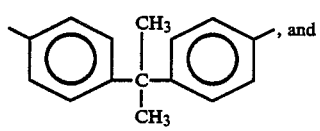

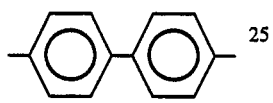

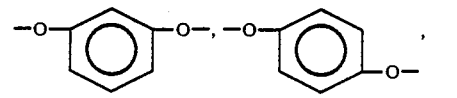

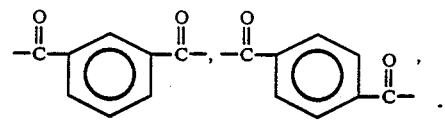

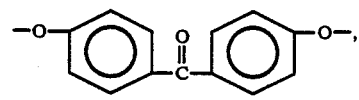

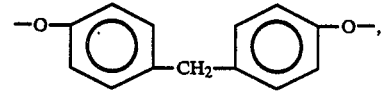

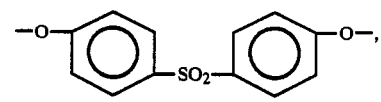

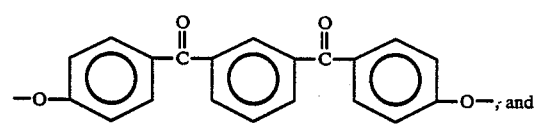

comprising the steps of:
reacting an amino-substituted aromatic acetylene with aromatic bismaleimide oligomers having the formula:

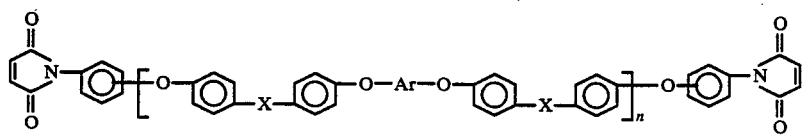

or

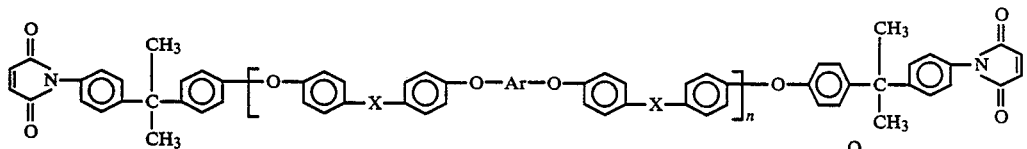

in a polar solvent;
evaporating said polar solvent; and
removing all traces of the polar solvent to produce said acetylene-terminated aspartimide.

21. A process for preparing an acetylene terminated aspartimide having the formula:

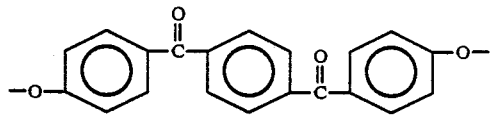

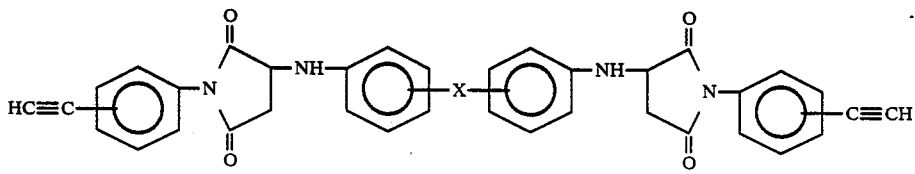

wherein X is a bond or a divalent radical selected from the group consisting of: $CH_2$, O, S, C=O, $SO_2$, $C(CH_3)_2$, $C(CF_3)_2$, comprising the steps of:
reacting an aromatic diamine having the formula:

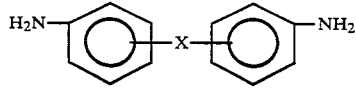
with an ethynyl containing maleimide having the formula:
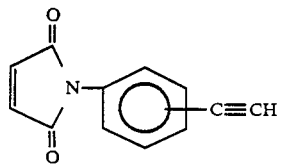
in a polar solvent;
evaporating said polar solvent; and
removing all traces of the polar solvent to produce said acetylene terminated aspartimide.
22. A process for preparing acetylene terminated aspartimide oligomers having the general formula:

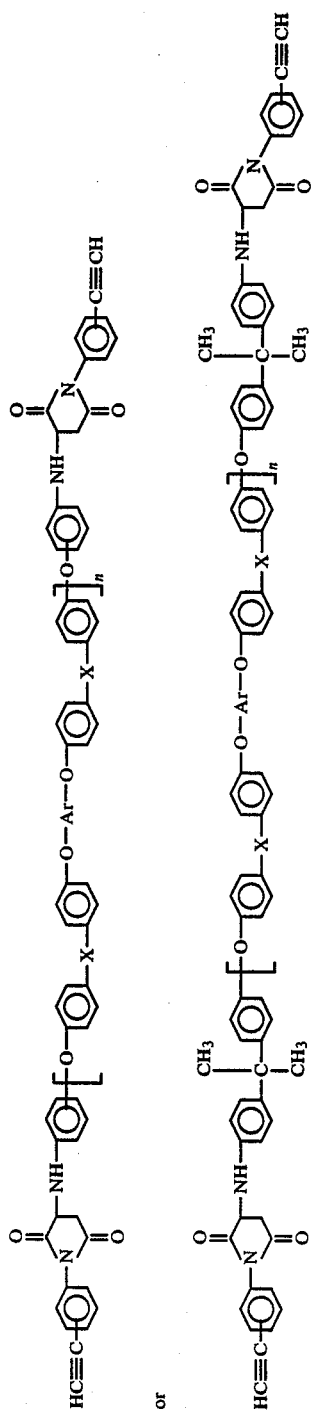

where n is an integer from one to sixty; X is a divalent radical selected from the group consisting of:

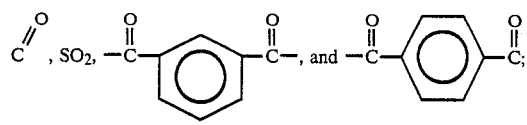

and Ar is a divalent radical selected from the group consisting of:

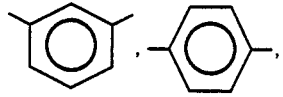

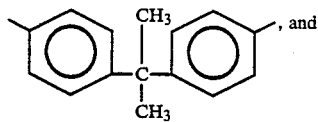

comprising the steps of:
reacting aromatic diamine oligomers having the formula:

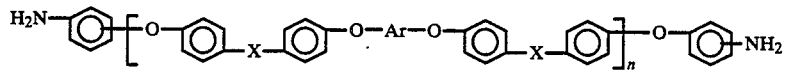

or

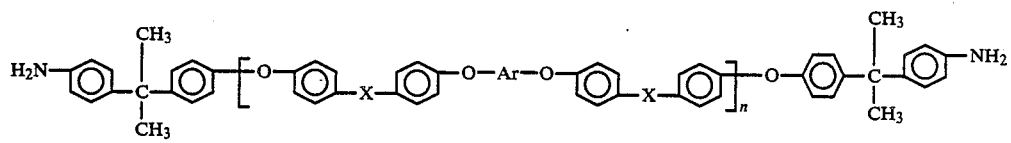

with an ethynyl containing maleimide having the formula:

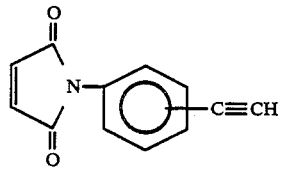

in a polar solvent;
evaporating said polar solvent; and
removing all traces of the polar solvent to produce said acetylene terminated aspartimide.

* * * * *